US012373065B1

(12) United States Patent
Barnea et al.

(10) Patent No.: US 12,373,065 B1
(45) Date of Patent: Jul. 29, 2025

(54) TRACKING TOUCHPAD CONTACTS

(71) Applicant: Microsoft Technology Licensing, LLC, Redmond, WA (US)

(72) Inventors: Shiran Barnea, Herzliya (IL); On Haran, Kfar Saba (IL); Hila Malihi, Jerusalem (IL); Adar Daniel Englert, Tel Aviv (IL); Eviatar George Zweigenberg, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/596,462

(22) Filed: Mar. 5, 2024

(51) Int. Cl.
*G09G 3/04* (2006.01)
*G06F 3/038* (2013.01)
*G06F 3/041* (2006.01)
*G06F 3/0354* (2013.01)

(52) U.S. Cl.
CPC .......... *G06F 3/04186* (2019.05); *G06F 3/038* (2013.01); *G06F 3/04166* (2019.05); *G06F 3/03547* (2013.01)

(58) Field of Classification Search
CPC ............................................... G06F 3/041–048
See application file for complete search history.

(56) References Cited

U.S. PATENT DOCUMENTS

| 7,928,964 | B2 * | 4/2011 | Kolmykov-Zotov ........................ G06F 3/03545 345/173 |
| 10,409,412 | B1 * | 9/2019 | Andre ..................... G06F 3/044 |
| 2015/0355716 | A1 * | 12/2015 | Balasubramanian ........................ G06F 3/04186 345/173 |
| 2016/0306449 | A1 | 10/2016 | De Los Reyes |
| 2016/0357297 | A1 | 12/2016 | Picciotto |
| 2017/0357403 | A1 | 12/2017 | Geary |

OTHER PUBLICATIONS

Prabhakar, et al., "Comparison of three hand movement tracking sensors as cursor controllers.", In 2016 International Conference on Control, Instrumentation, Communication and Computational Technologies (ICCICCT), 2016, pp. 358-364.

* cited by examiner

*Primary Examiner* — Roy P Rabindranath
(74) *Attorney, Agent, or Firm* — Alleman Hall & Tuttle LLP

(57) ABSTRACT

A computing device comprises a touchpad, a processor, and a memory storing instructions executable by the processor to track a contact on a touchpad. A measured velocity and a measured force of the contact on the touchpad are determined. The measured velocity is normalized to a normalized velocity and the measured force of the contact is normalized to a normalized force. Based at least in part on the normalized velocity and the normalized force, a reported position of the contact on the touchpad is temporarily frozen.

20 Claims, 12 Drawing Sheets

| Condition | Description | Parameters | Values |
|---|---|---|---|
| SlowRecently | At least one of the recent frames had an indication of slow velocity. | SlowVelocityTH<br>MaxRecentFrames | 0.2 – 0.6<br>3 - 12 |
| Fast | The velocity exceeds a threshold | FastVelocityTH | 12 - 20 |
| WeakForce | The force drops below a threshold | HighWeakForceTH<br>LowWeakForceTH | 0.6 – 0.9<br>0.3 – 0.7 |
| Declining Force | Consecutive decreases in the force | DecliningTH<br>NotDecliningCounter | -0.01 - -0.1<br>1 - 4 |
| SmallContact | Contact size reduces below a threshold | SmallContactTH | 0.7 – 0.99 |
| MustLiftWithVelocity | A combination of conditions with more stringent thresholds expressed as a % of default values | % FastVelocityTH<br>% ForceTH<br>% SmallContactTH | 50% - 90%<br>60% - 90%<br>70% - 90% |
| MustLiftWithoutVelocity | A combination of conditions not including contact velocity with more stringent thresholds | ForceTHWithoutVelocity<br>SmallContactTHWithoutVelocity | 0.2 – 0.3<br>0.7 – 0.8 |
| ForceStatic | The force changes less than a threshold. Where ForceStatic is False, logic stays in Considering Lift state for MaxAdditionalFrames | ForceStaticTH<br>MaxAdditionalFrames | 5% - 20%<br>1 – 10 |

FIG. 11

TRACKING TOUCHPAD CONTACTS

BACKGROUND

Some computing devices include a touchpad for receiving user inputs. Some user interactions with touchpads can cause unintended cursor movements.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed relating to touchpads, computing devices, and related methods for tracking touch input on a touchpad. In some examples, configurations of the present disclosure include a method for tracking a contact on a touchpad to prevent unintended cursor movement. The method comprises determining a measured velocity and a measured force of the contact on the touchpad. The measured velocity is normalized to a normalized velocity and the measured force of the contact is normalized to a normalized force. Based at least in part on the normalized velocity and the normalized force, a reported position of the contact on the touchpad is temporarily frozen.

BRIEF DESCRIPTION OF THE DRAWINGS

FIG. 11 is a table of example parameter threshold value ranges for different configurations of touchpads and computing devices with which the techniques of the present disclosure can be implemented.

DETAILED DESCRIPTION

Figure 1:
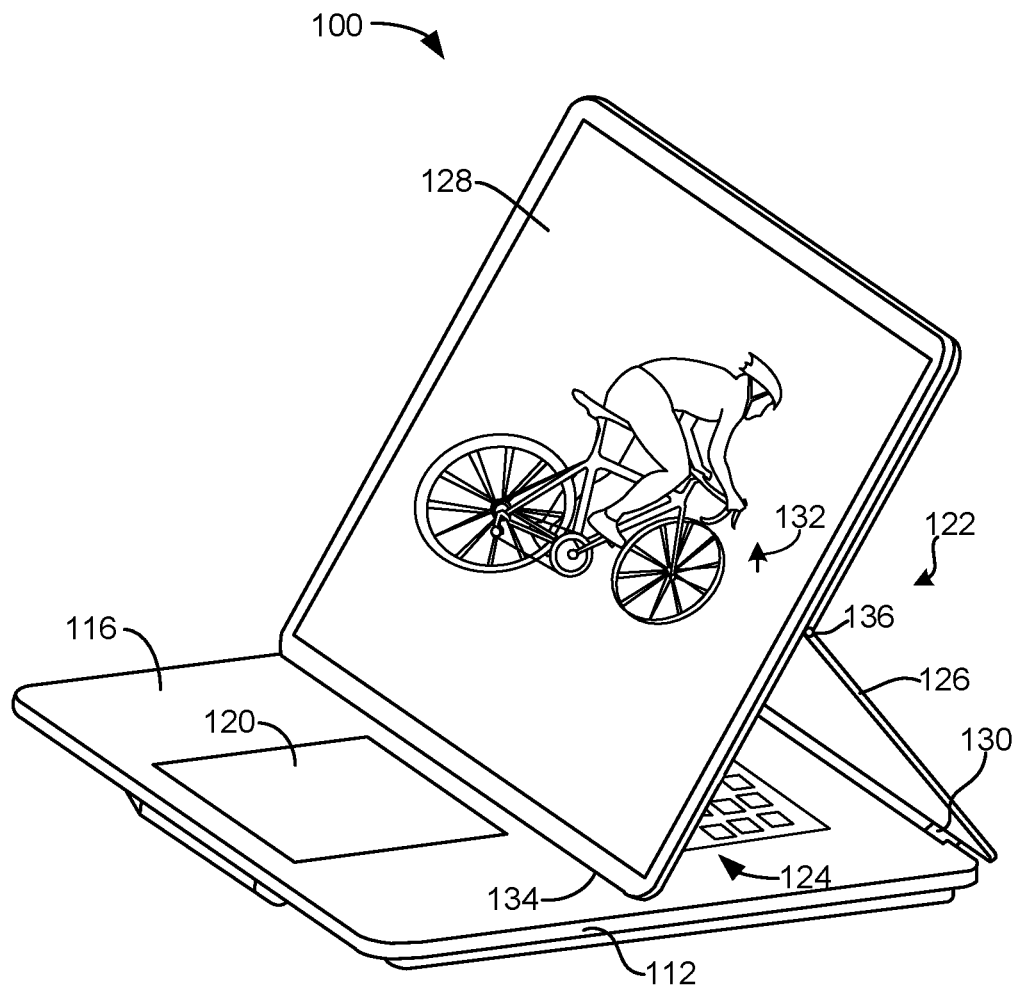
FIG. 1 shows one example of a computing device utilizing a touchpad according to examples of the present disclosure.

Some computing devices include a touchpad for receiving user inputs. In some examples these touchpads can determine touch locations and magnitudes of force being applied to their surfaces.

In some use cases users interacting with touchpads experience unintended cursor movements or jumps. For example, such unintended cursor movements can occur when users lift their finger from the touchpad, resulting in a rapid change in the contact geometry that inadvertently moves the cursor's position on the screen. This effect can be especially disruptive during tasks requiring precision, such as click-and-drag operations, where maintaining cursor stability is particularly desirable. In these situations, users may experience frustration and decreased productivity as they are forced to repeatedly reposition the cursor to the desired location.

Accordingly, and as described in more detail below, configurations of the present disclosure provide touchpad signal processing and related methods that prevent unintended cursor movements and thereby enable users to effectively utilize a touchpad and provide precise and intended user inputs. More particularly, the disclosed configurations predict when a user's finger is about to be lifted or semi-lifted from the touchpad. This lifting action corresponds with a user intent for the cursor to stay at its current position. Using this prediction, a reported position of the contact on the touchpad is temporarily frozen. In some examples, temporarily freezing the reported position of the contact includes temporarily not reporting subsequent measured positions of the contact to the operating system. In some examples, temporarily freezing the reported position of the contact includes continuing to report to the operating system the last valid position of the contact prior to the lifting action beginning instead of the actual measured positions for subsequent frames in which touch is detected. In some examples, temporarily freezing the reported position of the contact includes continuing to report subsequently measured positions to the operating system and overriding these reports with the last valid position of the contact prior to the lifting action beginning. In any of these examples, the reported position of the contact can be temporarily frozen until the occurrence of one or more subsequent events, such as until no touch is detected and later a subsequent touch input is received. In this manner and in one potential advantage, the position of the cursor on the corresponding display is temporarily maintained to match the user's intent.

Additionally, configurations of the present disclosure utilize normalized velocities and normalized forces of a contact on the touchpad to determine when to temporarily freeze a reported position of the contact. In another advantage and as described further below, utilizing these normalized values enables these configurations and methods to be broadly utilized with a wide variety of users having a wide range of user characteristics, including variations in finger weight, size, and positioning. Similarly and in another advantage, the disclosed configurations can be utilized with a wide variety of touchpad designs, architectures, and configurations. For example, in different configurations touchpads can utilize different quantities of touch sensors and/or force sensors, various sizes of sensors, and different sensor technologies, such as capacitive force sensors and strain gauge force sensors.

With reference now to FIGS. 1-11 and 13, an example computing device 100 is illustrated in the form of a laptop computer that includes a capacitive touch and force sensing touchpad 120 for tracking touch input on the touchpad according to aspects of the present disclosure. In other examples, the methods and touchpads of the present disclosure can be implemented in tablet computing devices, foldable computing devices including multiple touch screens, wearable and other mobile computing devices, and any other type of computing device that utilizes a touchpad. In some examples, the methods and touchpads of the present disclosure force can be implemented in keyboards or other user interface components that are separate from, or detachable from, a computing device.

The following examples discuss aspects of the present disclosure in the context of the configuration of FIGS. 1-11 and 13. In other examples, a variety of other force sensing touchpad configurations and touchpads using a variety of sensing technologies can be utilized to practice the techniques of the present disclosure.

In this example computing device 100 includes a chassis 112 that includes a planar user interactive surface 116 comprising a touchpad 120 and a keyboard 124. Computing device 100 also includes a touch-sensitive display 128 that is rotatably coupled to chassis 112 via a display positioning assembly 122. The display 128 may have any suitable size, resolution, and utilize any suitable display technology. As examples, the display 128 may be a liquid crystal display (LCD), light emitting diode (LED) display, plasma display, quantum dot display (QLED), e-ink/e-paper display, or other suitable display type. Additional details regarding the components and computing aspects of computing device 100 are described in more detail below with reference to the example computing system of FIG. 13.

In the present example, the display positioning assembly 122 enables multiple operating orientations and positionings of display 128 that provide a user with different modes of interacting with the computing device 100. The display positioning assembly 122 includes a collapsible support member 126 that is rotatably connected to the chassis 112 at a hinge 130. The bottom edge 134 of display 128 is not rigidly affixed to the user interactive surface 116 of the chassis 112. Rather, the bottom edge 134 of display 128 is moveable to any of a range of securable display positions along the user interactive surface 116.

In some examples, the collapsible support member 126 is moveably coupled to the display 128 via a living hinge 136. In other examples, the collapsible support member 126 may be moveably coupled to the display 128 via a mechanical hinge or any other suitable coupling that enables the display portion to pivot about the support member.

As described in more detail below, and in one potential advantage of the present disclosure, using signals from the touchpad 120 the computing device 100 is configured to track contacts on the touchpad in a manner that prevents unintended movements of the cursor 132. Advantageously, and as described further below, signals from the touchpad 120 are processed to temporarily freeze a reported position of the contact on the touchpad upon predicting that the user is lifting their finger or other contacting surface from the touchpad. In this manner, the configurations described herein can avoid unintended movements of the cursor 132 to thereby provide precise and user-intended positioning of the cursor.

In some examples, the touchpad 120 is a mutual capacitance touchpad. In these examples, touch inputs are identified by sampling capacitance between a driving electrode and a sensing electrode. Driving electrodes are arranged in an array within the touchpad 120. Touch detection signals are provided to each of the electrodes at a different frequency and/or at a different time. Conductive materials, such as a user's skin, draw current away from the driving electrodes when providing a touch input. The touch input can be identified by detecting this current, and a location of the touch input can be reconstructed based at least in part on determining which driving electrodes were being driven when the touch input occurred, and the frequency of the touch detection signal driving each driving electrode. In other examples, touchpads employing other touch detection technologies, including but not limited to self-capacitance and projected capacitance touch detection, can be utilized.

Figure 2:
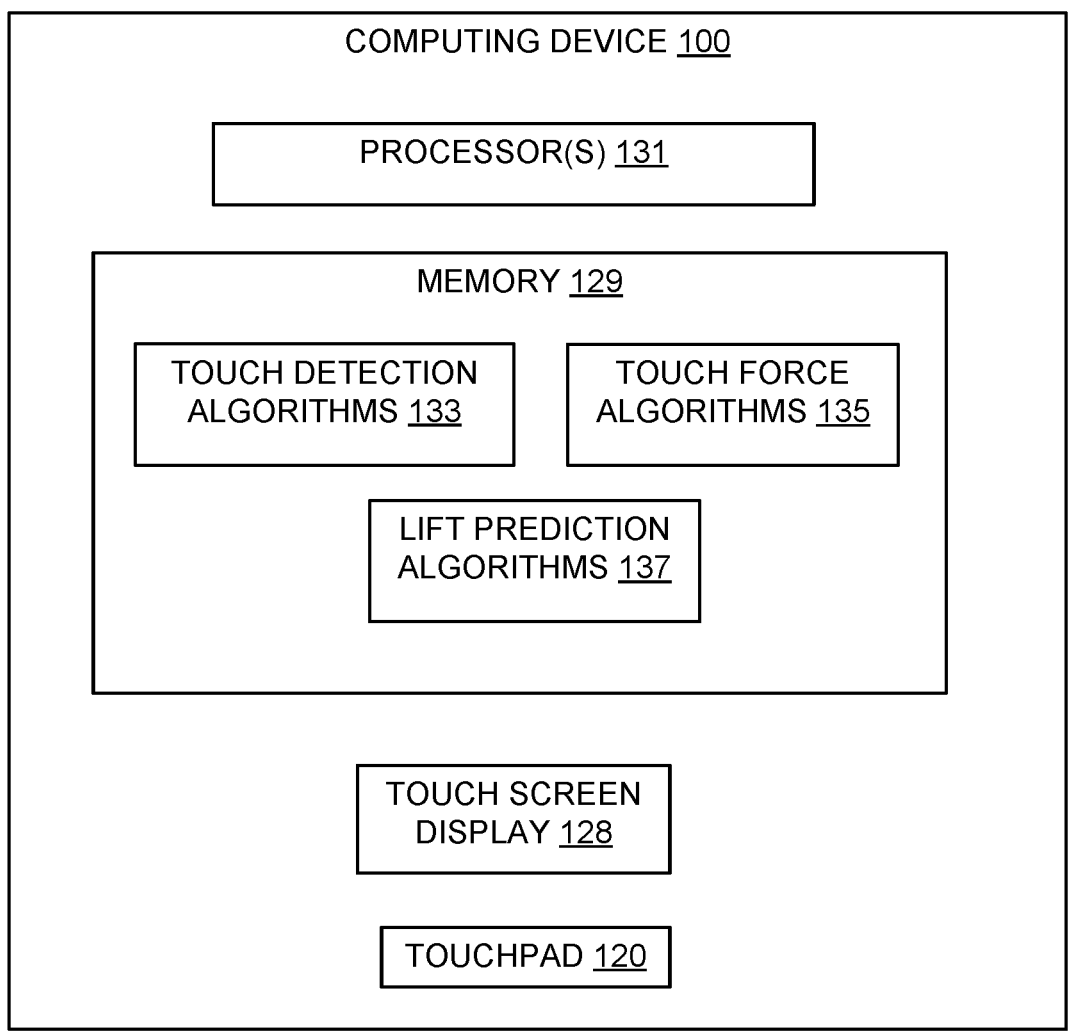
FIG. 2 shows a schematic view of selected components of the computing device of FIG. 1 according to examples of the present disclosure.

With reference now to FIG. 2, a schematic view of selected components of the example computing device 100 of FIG. 1 is provided. Computing device 100 includes memory 129 that stores instructions executable by a processor 131. For example and as described further below, memory 129 stores instructions in the form of touch detection algorithms 133 executable by the processor 131 to perform touch detection on the touchpad 120 using signals received from the touchpad. Similarly, memory 129 stores instructions in the form of touch force algorithms 135 executable by the processor 131 to determine a force of a touch input on the touchpad 120. Similarly and as described in more detail below, memory 129 stores instructions in the form of lift prediction algorithms 137 executable by the processor 131 to determine that the user is lifting their finger or other contacting surface from the touchpad and prevent corresponding unintended movements of the cursor 132. Additional details regarding memory 129, processor 131, and other components and subsystems of computing device 100 are described further below with reference to FIG. 13.

Figure 3:
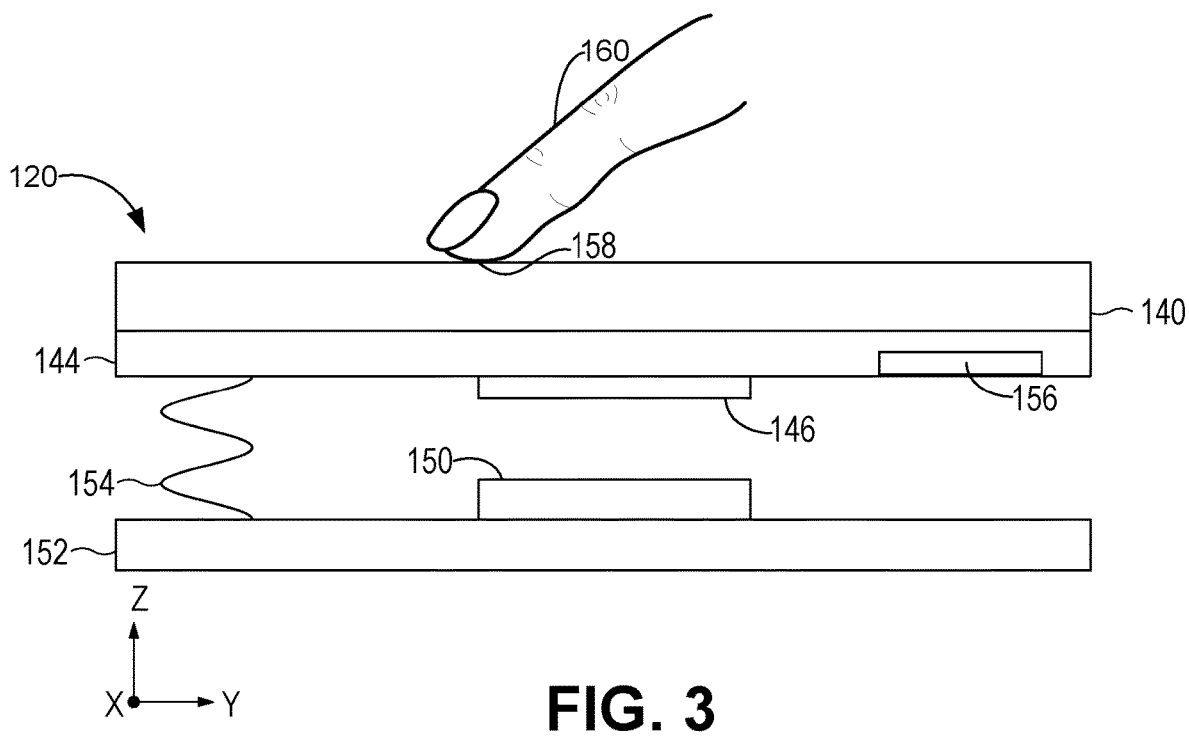
FIG. 3 shows a partial schematic cross section of the touchpad of FIG. 1.
Figure 4:
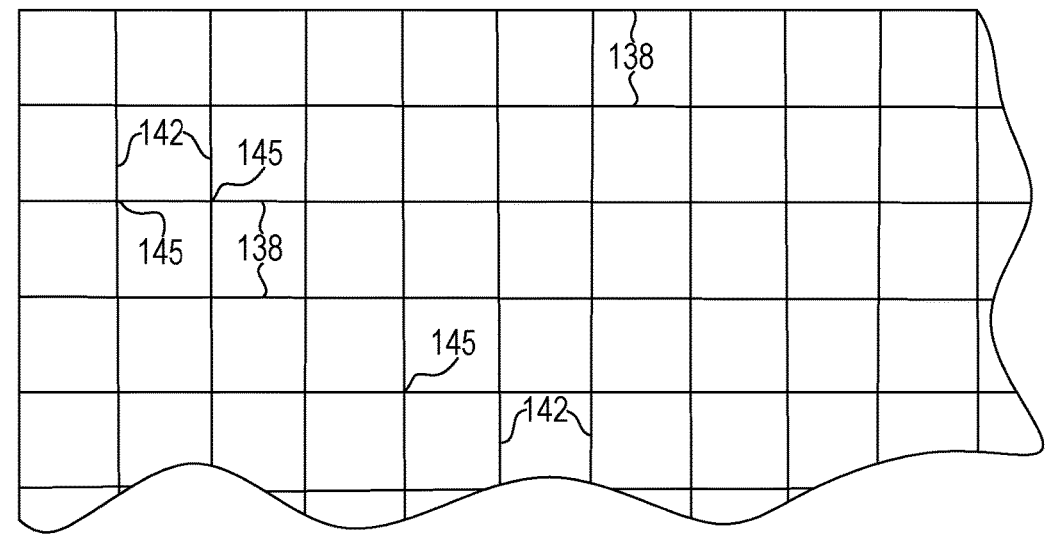
FIG. 4 shows a partial schematic view of capacitive horizontal and vertical antennas arranged in a grid in the touchpad.

With reference now to FIGS. 3 and 4, in one example touchpad 120 includes a cover glass layer 140 affixed to a printed circuit board (PCB) 144 by an adhesive layer (not shown). As described further below, a transparent array of capacitive touch antennas 138, 142 (sensors) in an upper layer of the PCB 144 is utilized to sense a plurality of touch contacts on the cover glass layer 140. In this example the PCB 144 also includes a PCB electrode 146 spaced from a base plate electrode 150 located on a base plate 152 and utilized for force sensing. In other examples, touchpads of the present disclosure can include two or more PCB electrodes and corresponding base plate electrodes.

As schematically indicated in FIG. 3, PCB 144 is spaced from and resiliently supported relative to the base plate 152. In this example, spring 154 resiliently supports the PCB 144 to enable movement toward and away from the base plate 152. In other examples, a variety of other configurations can be utilized to resiliently support the PCB relative to the base plate 152. In this example the PCB 144 also includes an integrated circuit 156 configured to perform touch detection functionality via the touchpad 120 using the array of touch sensors (antennas).

In this example, touchpad 120 also functions as a capacitive force transducer that utilizes displacement as a proxy for force. In such a parallel plate capacitor model, the capacitance is equal to the area of the PCB electrode 146 divided by the distance between the PCB electrode and the base plate electrode 150. When a force applied to the cover glass layer 140 compresses the spring 154 and reduces this distance, the capacitance changes. In this model, the capacitance is directly proportional to the applied force, and a measured change in capacitance can be used to calculate the magnitude of the applied force F.

With reference again to FIG. 4, in the present example the capacitive touch antennas include horizontal antennas 138 and vertical antennas 142 arranged in a grid along X- and Y-axes. In some examples, the antennas are evenly spaced, such as by 4 mm. between antennas. In some examples, touch inputs (contacts) are identified by sampling capacitance between a driving antenna and a sensing antenna. Signals are provided to the antennas at a different frequency and/or at a different time. A conductive object, such as a user's fingertip 158 or other body part, draws current away from the driving electrodes when providing a touch input. As described further below, the touch input can be identified by detecting this current and locations of the touch input can be reconstructed based on determining which driving electrodes were being driven when the touch input occurred, and the frequency of the signal driving each driving electrode. Detecting this current also includes detecting the current flow into various sensing antennas that results from the increased capacitive coupling between the driving antennas and the sensing antennas caused by the touch input.

With reference again to FIG. 4, in this example touch contact on the touchpad 120 from a user's skin changes a capacitance and the signals passing through one or more junctions 145 between antennas 138, 142. Touch detection algorithms 133 utilize signals from junctions 145 to build touch heat maps that represent area(s) of contact on the touchpad. In some examples, a touch heat map for each frame of data is used to determine a measured coordinate, such as the center of mass of the area(s) of contact, for each frame. In some examples the center of mass can be expressed in (x,y) coordinates in millimeters. In some examples, an X-Y coordinate system having its (0,0) coordinate corresponding to the top-most and left-most junction 145 in the antenna array is utilized.

As noted above, in some use cases unintended cursor movements can occur when users lift their finger from the touchpad, resulting in a rapid change in the contact geometry that inadvertently moves the cursor's reported and displayed position on the display. For example, during a navigation and/or click-and-drag gesture, a user moves their finger on the touchpad surface, with the finger creating a circular or spheroid-shaped contact geometry ("blob"). When the user begins detaching/lifting their finger from contact with the touchpad, the contact geometry rapidly changes to an elongated and smaller blob. This unintended rapid change in the geometry of the contact moves the contact center-of-mass and the corresponding finger position that is reported to the operating system (OS) of the computing device, resulting in an unintended jump in the displayed cursor position.

Figure 5:
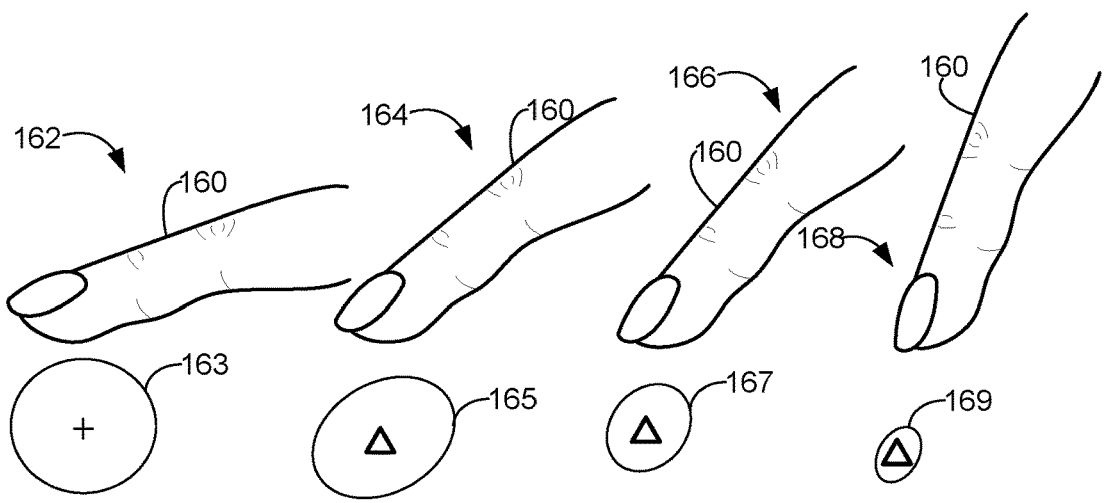
FIG. 5 shows an example of a finger lift process and corresponding changes in contact geometry according to examples of the present disclosure.
Figure 6:
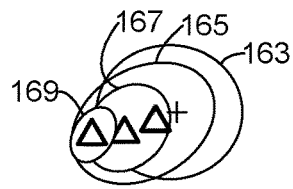
FIG. 6 shows the changes in contact geometry and center of mass during the finger lift of FIG. 5.

FIG. 5 illustrates an example of a user beginning to lift her finger 160 from contact with the touchpad and the corresponding changes in contact geometry and center of mass of the contact, with the center of mass indicated by the "+" and "A" indicators. FIG. 6 shows the contact geometries superimposed over one another to illustrate the decreasing area and changing position of the center of mass of the contact during a lift process. With reference again to FIG. 5, at position 162 the user has stopped moving her finger 160 across the touchpad 120 with the intention of maintaining the displayed cursor at its currently-displayed position. At this position the user's finger generates the illustrated contact geometry 163 on the touchpad 120, with the "+" indicator designating the center of mass of the contact geometry that corresponds to the intended position of the displayed cursor 132 (see also FIG. 6).

Positions 164, 166 and 168 show the finger 160 in the process of decreasing its contact with the touchpad 120 as it is lifted from the touchpad. At position 164 the contact geometry 165 has decreased in size and the center of mass, indicated by the "Δ" indicator, has shifted on the touchpad. Thus, the "Δ" indicator corresponds to an unintended position of the displayed cursor. At position 166 the contact geometry 167 has further decreased in size and the center of mass has continued to shift. At position 168 the contact geometry 169 has further decreased in size and the center of mass "Δ" has continued to move away from the originally intended position corresponding to the "+" indicator.

Figure 7:
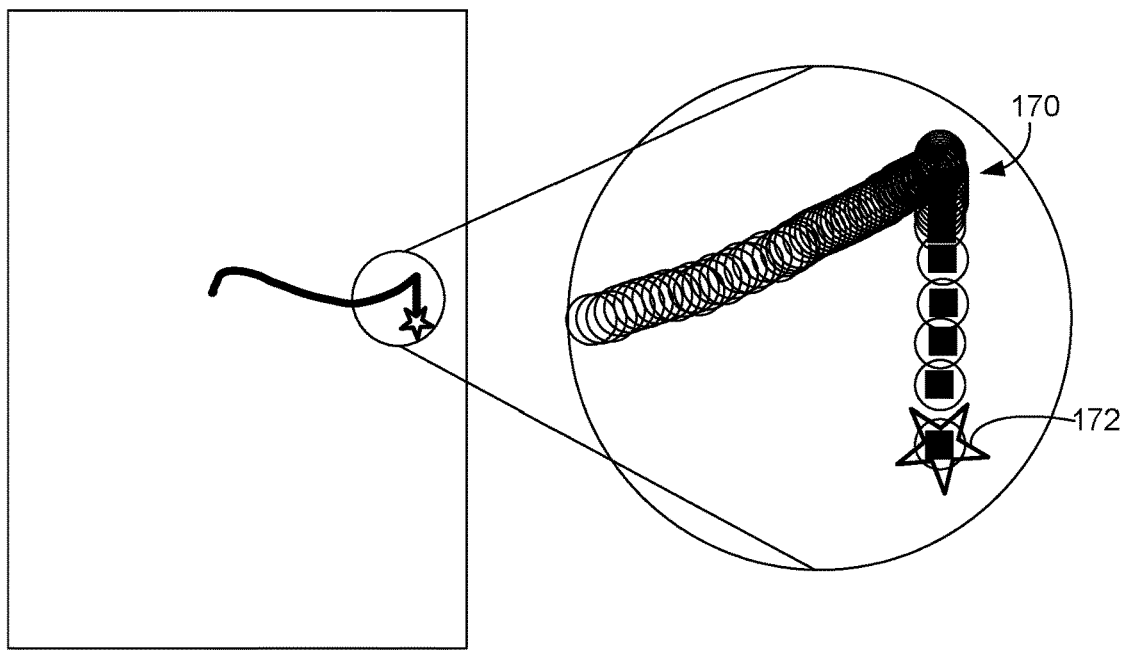
FIG. 7 shows an example of tracking the location of a moving contact on the touchpad according to examples of the present disclosure.

FIG. 7 schematically illustrates tracking reported positions of a user's finger during a cursor navigation process that ends with the finger lifting from the touchpad. The reported positions are indicated by the circles, with the arrow 170 indicating the beginning of the lifting process which corresponds to the user's last intended position of the contact. At the end of the lifting process the last reported position of the finger's contact with the touchpad is indicated by the star 172. The black squares indicate positions of unintentional movement of the finger position and corresponding displayed cursor position shifts during the lifting process.

Figure 8:
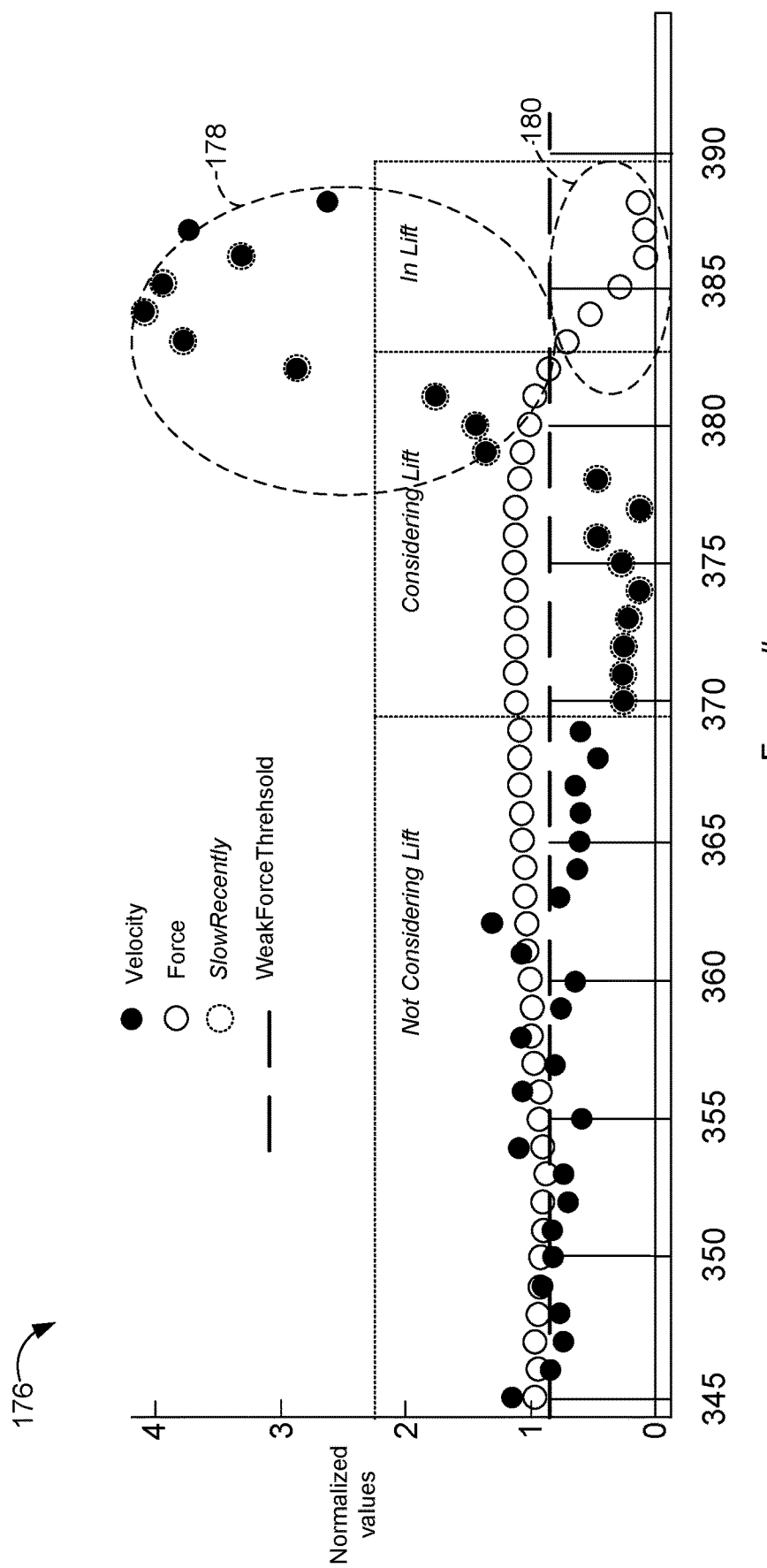
FIG. 8 shows an example of normalized velocity and force values of a contact across multiple frames of data according to examples of the present disclosure.

With reference now to FIG. 8, an example graph 176 schematically illustrates velocity and force values at a plurality of consecutive frames of sensor data from the touchpad 120 during movement of a finger across the touchpad ending with the finger lifting from the touchpad. As indicated in the grouping 178 of velocity values and grouping 180 of force values, during many contact lifting operations the velocity of the contact quickly increases and the force of the contact decreases during the lifting process.

In one potential advantage of the present disclosure, and as described in more detail below, the measured velocity values are normalized relative to a window of immediately prior measured velocities of the contact on the touchpad 120. Advantageously, utilizing these normalized values enables these configurations and methods to be broadly utilized with a wide variety of users having a wide range of user characteristics, including variations in finger weight, size, and positioning. Similarly, the disclosed configurations can be utilized with a wide variety of touchpad designs, architectures, and configurations.

In some examples, the measured velocities are normalized by computing an average velocity of the contact over a window of prior frames of data. For example, to compute the normalized velocity of the contact at frame 365, the average velocity of the contact over a window of the prior 15 frames of data is computed. The measured velocity at frame 365 is divided by this average velocity to yield the normalized velocity at frame 365. In other examples, other window sizes of prior frames of data can be utilized.

Similarly, the force values are normalized relative to a window of immediately prior force values of the contact on the touchpad 120. Like the velocity values, in some examples the measured forces are normalized by computing an average force of the contact over a window of prior frames of data. For example, to compute the normalized force of the contact at frame 365, the average force of the contact over a window of the prior 15 frames of data is computed. The measured force at frame 365 is divided by this average force to yield the normalized force at frame 365.

In other examples, other window sizes of prior frames of data can be utilized. In some examples, the window sizes for calculating the normalized force can be different from the window size for calculating the normalized velocity.

In another potential advantage of the present disclosure, the graph 176 can be divided into three states or activity zones: Not Considering Lift, Considering Lift, and In Lift. In the Not Considering Lift zone, both the force and velocity are considered relatively stable relative to their previous values (normalized by their moving average), therefore indicating a relatively steady movement of the contact which is typically associated with intended cursor movement. In the Considering Lift zone, the normalized velocity slows down as a "preparation" for lifting the finger and enabling more precise control of the cursor, while the force applied by the finger is still in a relatively steady-state. In the In Lift zone, the normalized velocity increases rapidly due to the change in the finger geometry, and concurrently the force applied by the finger drops.

Advantageously and as described in more detail below, by classifying each frame of data into one of the three activity zones, the techniques of the present disclosure can utilize different parameters and thresholds to predict when a lift process is beginning and thereby prevent subsequent unintended cursor jumps by temporarily freezing the reported position of the contact at the last frame of data prior to the lift process. Further, the techniques of the present disclosure include protections from false positives, e.g., mistaken determinations of a lift process that would freeze the cursor position when the user's intent is to move the cursor.

Accordingly, as described in more detail below and in one potential advantage, configurations of the present disclosure provide touchpad signal processing and related methods that prevent unintended cursor movements and thereby enable users to effectively utilize a touchpad and provide precise and intended user inputs. More particularly, the disclosed configurations predict when a user's finger is about to be lifted or semi-lifted from the touchpad. This lifting action corresponds with a user intent for the cursor to stay at its current position. Using this prediction, a reported position of the contact on the touchpad is temporarily frozen as described above. In this manner and in one potential advantage, the position of the cursor on the corresponding display is maintained to match the user's intent.

As described further below, the techniques of the present disclosure analyze at least the user's finger velocity and force on the touch pad and compare these measured values against their moving average to detect when the finger is about to be lifted. A state machine can be employed to categorize a touchpad contact into one of the three states: 'Not Considering Lift,' 'Considering Lift,' and 'In Lift.' By setting specific conditions and thresholds for these states, the system can preemptively identify the 'In Lift' state and suppress unintended cursor movements by maintaining the last valid cursor position before the lift.

Figure 9:
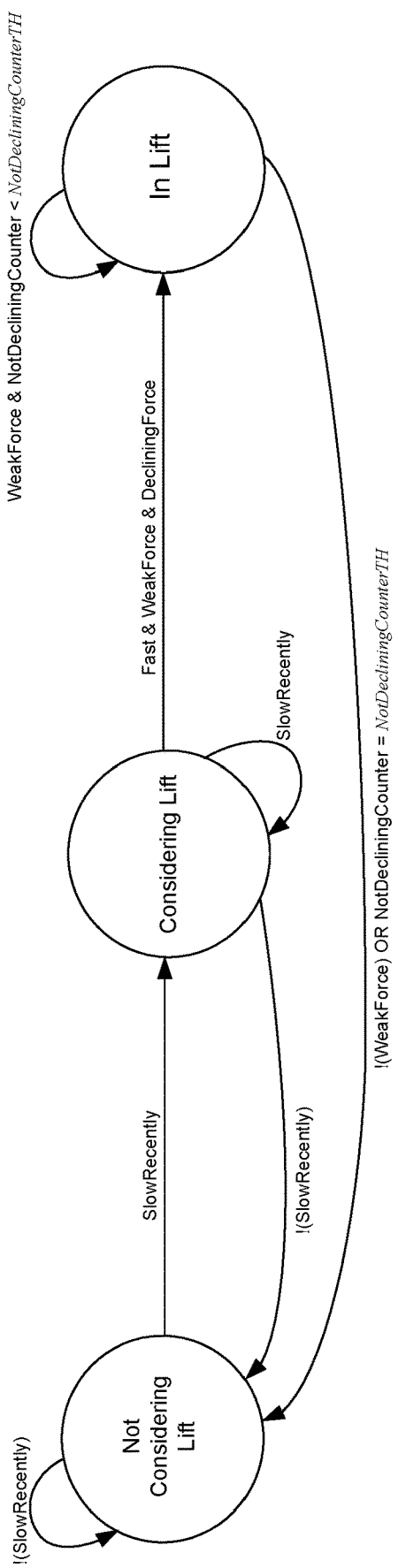
FIG. 9 schematically illustrates a state machine for utilizing normalized velocity and force values to determine when a contact is lifting from the touchpad according to an example of the present disclosure.

With reference now to FIG. 9, one example state machine implementing logic of the present disclosure is illustrated. In this example, the state machine categorizes touchpad contacts into one of the three states, allowing for more nuanced and accurate predictions of unintended cursor movements. As described further below, for each frame of data from the touchpad's sensors, the contact's normalized force and velocity are determined. One or more parameters of the contact and corresponding threshold values are applied and assessed to accurately determine the state of the contact in the current frame of data.

In the example of FIG. 9 and for the "Not Considering Lift" state, a SlowRecently velocity parameter is analyzed by comparing the normalized velocity of the contact to a slow velocity threshold SlowVelocityTH. Where the normalized velocity is below the SlowVelocityTH threshold, the SlowRecently velocity parameter is satisfied and the next frame will be classified in the "Considering Lift" state where the logic proceeds to determine if additional parameters are satisfied before temporarily freezing the reported position of the contact. With reference again to the example of FIG. 8, in frame 370 the normalized velocity of the contact has dropped below the SlowVelocityTH threshold of 0.4, thereby satisfying the SlowRecently parameter as indicated by the dashed circle around the velocity indicator. Additionally and as described further below, the SlowRecently velocity parameter is also analyzed for a predetermined number of prior consecutive frames of data. Where at least one of these prior frames of data has a normalized velocity below the SlowVelocityTH threshold, the slow velocity parameter is satisfied and the current frame is maintained in the "Considering Lift" state.

With reference again to FIG. 9, for the "Considering Lift" state and based at least in part on the normalized velocity and the normalized force of the contact, a combination of parameters are analyzed to determine whether to classify the contact in the "In Lift" state and correspondingly temporarily freeze the reported position of the contact on the touchpad. In this example, Fast velocity, WeakForce force, and DecliningForce force parameters are analyzed. More particularly, for the Fast velocity parameter the normalized velocity of the contact is compared to a fast velocity threshold FastVelocityTH. Where the normalized velocity meets or exceeds the fast velocity threshold FastVelocityTH, the parameter is satisfied.

The normalized force of the contact is compared to a weak force threshold. Where the normalized force drops below the weak force threshold, the WeakForce parameter is satisfied. In some examples, two or more weak force thresholds can be utilized to more accurately assess this parameter across different users who apply different magnitudes of contact force to the touchpad. In one example, a high weak force threshold HighWeakForceTH is selected and utilized when the measured force meets or exceeds a measured force threshold, and a lower weak force threshold LowWeakForceTH is selected and utilized when the measured force is below the measured force threshold. In other examples, three or more different weak force thresholds can be utilized.

As noted above, in some examples touchpads of the present disclosure can utilize one or more force sensors, such as one or more pairs of PCB and corresponding base electrodes. For touchpads utilizing a plurality of force sensors, in different examples normalized force(s) from one or more of the force sensors can be utilized to determine whether a weak force threshold is satisfied. In some of these examples, the normalized force of the contact is determined by summing the forces determined by all of the force sensors. In other examples, forces from less than all of the force sensors can be utilized to determine whether a weak force threshold is satisfied. Examples can include using only the sensor signal having the greatest magnitude, using the two sensor signals having the two greatest magnitudes (or three signals, or four signals, etc.), using the signal from the force sensor located closest to the touch location of the contact, and using the two signals from the two force sensors located closed to the touch location of the contact (or three signals, or four signals, etc.).

The normalized force of the contact is also compared to a declining force threshold DecliningTH. This DecliningForce parameter determines whether the force of the contact has decreased relative to one or more prior consecutive frames of data. Where the force has decreased relative to the one or more prior consecutive frames of data, the DecliningForce parameter is satisfied.

Accordingly and from the "Considering Lift" state, where the Fast velocity, WeakForce force, and DecliningForce force parameters are all satisfied, the next frame will be classified in the "In Lift" state and the logic proceeds to temporarily freeze the most recent reported position of the contact ("frozen position"). In one potential advantage of this configuration, by analyzing each of the Fast velocity, WeakForce force, and DecliningForce force parameters, accurate determinations of a lifting process can be made with high confidence values. Further, the logic maintains the position freeze and continues to report the frozen position as long as the "In Lift" state is maintained. In the present example, to determine whether to maintain the "In Lift" state for subsequent frames of data, the logic determines whether both of the WeakForce force and the DecliningForce force parameters are satisfied.

Where both of these parameters are satisfied for a given frame of data, the "In Lift" state is maintained and the next frame of data is similarly analyzed. Where the WeakForce parameter is not satisfied for a given frame of data, the logic transitions back to the "Not Considering Lift" state and a new contact position of the given frame of data is reported to the operating system. Where the WeakForce parameter is satisfied but the DecliningForce force parameter is not satisfied (i.e., the force has increased with respect to the previous frame), a declining force counter is incremented by one. At each subsequent frame of data the logic determines whether the declining force counter value reaches a not declining counter threshold NotDecliningCounterTH value. Where the not declining counter threshold NotDecliningCounterTH value is reached at a given frame of data, the logic transitions back to the "Not Considering Lift" state and a new contact position of the given frame of data is reported.

Returning to the "Considering Lift" state, for a given frame of data that does not satisfy each of the Fast velocity, WeakForce force, and DecliningForce force parameters, the SlowRecently parameter is analyzed by comparing the normalized velocity of the contact to the SlowRecently velocity threshold SlowVelocityTH. Additionally, the SlowRecently parameter is also analyzed for a plurality of consecutive prior frames of data up to a maximum number of consecutive prior frames of data corresponding to a MaxRecentFrames value, such as 10. Where at least one frame of data from the current frame and the immediately prior frames up to the MaxRecentFrames value has a normalized velocity below the SlowVelocityTH threshold, the slow velocity parameter is satisfied and the current frame is maintained in the "Considering Lift" state. Where at least one frame of data from the current frame and the immediately prior frames up to the MaxRecentFrames value has a normalized velocity that meets or exceeds the SlowVelocityTH threshold, the slow velocity parameter is not satisfied and the logic returns to the "Not Considering Lift" state.

Figure 10:
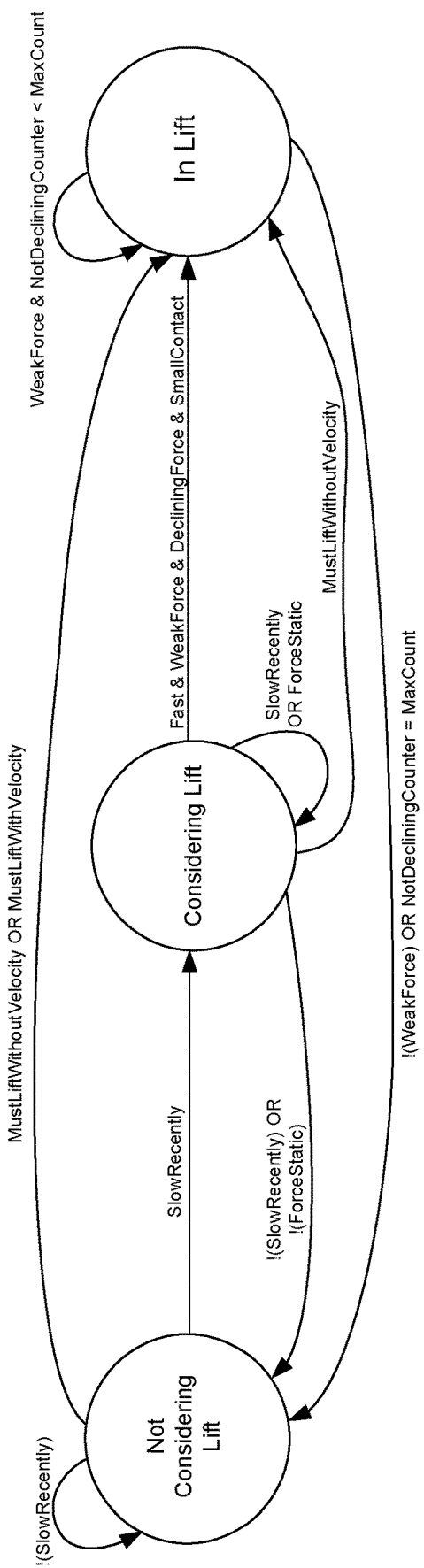
FIG. 10 schematically illustrates another state machine for utilizing normalized velocity, force, and contact size values to determine when a contact is lifting from the touchpad according to another example of the present disclosure.

In other examples, one or more additional conditions and parameters can be added to the state machine to more accurately determine the current state of a contact, reduce false determinations of a lifting process, and generally improve the prediction capabilities of the system. With reference now to FIG. 10, in this example several additional conditions and parameters are added to the state machine described above in FIG. 9. In one example, an additional characteristic of the contact in the form of a size of the contact on the touchpad (blob size) is measured and utilized to more accurately identify the "In Lift" state. As shown in FIG. 10, when the state machine is in the "Considering Lift" state, in addition to analyzing the Fast, WeakForce, and DecliningForce parameters for a contact as described above, in this example the measured size of the contact on the touchpad is also determined and analyzed with respect to a SmallContact parameter. As with the velocity and force values of a contact described above, prior measured sizes of the contact on the touchpad from prior frames of data are utilized to normalize a current measured size to a normalized size of the contact.

In some examples, normalizing the measured size of the contact to a normalized size comprises computing an average size of the contact over a window of prior frames of data. For example, to compute the normalized size of the contact at frame 365, the average size of the contact over a window of the prior 10 frames of data is computed. The measured size at frame 365 is divided by this average size to yield the normalized size at frame 365. In other examples, other window sizes of prior frames of data can be utilized.

For the SmallContact contact size parameter the normalized size of the contact is compared to a small contact threshold SmallContactTH. Where the normalized contact size is below the small contact threshold SmallContactTH, the parameter is satisfied. Accordingly and as shown in FIG. 10, in this example from the "Considering Lift" state, where the Fast velocity, WeakForce force, DecliningForce force, and SmallContact parameters are all satisfied, the next frame will be classified in the "In Lift" state where the logic proceeds to temporarily freeze the most recent reported position of the contact. In one potential advantage of this configuration, by analyzing the SmallContact size parameter in addition to the other parameters, erroneous determinations of a lifting process can be reduced or substantially eliminated.

Also with respect to maintaining the "Considering Lift" state, another parameter in addition to the SlowRecently condition is utilized to address use cases where a user slows movement of their finger and maintains their finger in a paused position with a fairly consistent force on the touchpad. In these situations, because the user may be pausing before proceeding to lift their finger, the logic in this example maintains the "Considering Lift" state as long as the change in the force stays below a force static threshold ForceStaticTH and for a predetermined period after the force changes more than the force static threshold ForceStaticTH.

Accordingly, from the "Considering Lift" state the normalized force of the contact is determined and a ForceStatic parameter is analyzed by comparing the change in the normalized force with respect to the normalized force in the prior frame of data to the force static threshold ForceStaticTH. Where the change in the normalized force is below the force static threshold ForceStaticTH, such as a 15% change in force, the next frame will be maintained in the "Considering Lift" state. Where the change in the normalized force meets or exceeds the force static threshold ForceStaticTH, a maximum additional frames counter is incremented by one, and subsequent frames are maintained in the "Considering Lift" state until the maximum additional frames counter reaches a MaxAdditionalFrames threshold value, such as 5 frames. When the maximum additional frames counter reaches the MaxAdditionalFrames threshold value, the ForceStatic parameter is not satisfied, the logic transitions back to the "Not Considering Lift" state, and a new contact position of the given frame of data is reported. Advantageously and in this manner, the "Considering Lift" state is maintained while the force stays relatively static and for a short period after the force exceeds the force static threshold ForceStaticTH, thereby accommodating use cases where a user slows movement of their finger and pauses before potentially starting a to lift their finger.

Also with respect to transitioning to the "In Lift" state, the example of FIG. 10 includes additional combinations of conditions that utilize more stringent thresholds for identifying situations in which the user is likely lifting her finger, and for correspondingly entering the "In Lift" state. In one example, from the "Considering Lift" state, a "MustLiftWithout Velocity" combination of a contact force condition and a contact size condition is analyzed to determine whether to transition to the "In Lift" state and temporarily freeze the reported position of the contact. In this example, a much lower contact force threshold is utilized as compared with the WeakForce thresholds discussed above.

For example and with reference to the table of example value ranges for thresholds and parameters of FIG. 11, the "MustLiftWithout Velocity" combination can utilize a ForceTHWithoutVelocity threshold value of 0.2-0.3 as compared to a threshold value for the HighWeakForceTH in the range of 0.6-0.9 and a threshold value for the LowWeakForceTH in the range of 0.3-0.7. Similarly, a lower contact size threshold is utilized as compared with the SmallContactTH threshold discussed above. For example and with reference again to FIG. 11, the "MustLiftWithoutVelocity" combination can utilize a SmallContactTHWithoutVelocity threshold value of 0.7-0.8 as compared to the SmallContactTH value discussed in the range of 0.7-0.99. Accordingly, and in one potential advantage of this example, the MustLiftWithout Velocity condition can identify certain use case scenarios in which a much lower contact force combined with a lower contact size predicts that the user is beginning to lift her finger from the touchpad. As shown in FIG. 10, the state machine of this example also utilizes the identification of the MustLiftWithout Velocity condition to bypass the "ConsideringLift" state and transition directly from the "NotConsideringLift" state to the "In Lift" state.

Additionally, and with reference to the "NotConsideringLift" state, the state machine of FIG. 10 can also identify a MustLiftWith Velocity condition that indicates the user is beginning to lift her contact with the touchpad, and correspondingly transition directly from the "NotConsideringLift" state to the "In Lift" state. In one example, from the "NotConsideringLift" state, a "MustLiftWith Velocity" combination of a velocity parameter, contact force parameter, and contact size parameter is analyzed to determine whether to transition to the "In Lift" state and temporarily freeze the reported position of the contact. In this example, in addition to a lower contact force threshold and smaller contact size threshold, a slower velocity threshold is utilized as compared with the FastVeloctyTH threshold discussed above.

In some examples, for each of these three thresholds the "MustLiftWith Velocity" combination can utilize values that are a percentage of the corresponding "default" thresholds for these conditions. For example and with reference again to FIG. 11, a % FastVelocityTH threshold value in the range of 50%-90% of the FastVelocityTH value discussed above can be utilized. Similarly, a % ForceTH threshold value in the range of 60%-90% of the HighWeakForceTH value or the LowWeakForceTH value (whichever has been selected as discussed above) can be utilized. Also, a % SmallContactTH threshold value in the range of 70%-90% of the SmallContactTH value discussed above can be utilized. Accordingly, and in one potential advantage of this example, the MustLiftWith Velocity condition can identify other use case scenarios in which a combination of lower contact velocity, force, and size predicts that the user is beginning to lift her finger from the touchpad, and can correspondingly bypass the "ConsideringLift" state and transition directly from the "NotConsideringLift" state to the "In Lift" state and temporarily freeze the reported position of the contact.

As noted above, FIG. 11 is a table of example value ranges for thresholds and parameters described above. It will be appreciated that these thresholds and parameters can be empirically tuned for different configurations of touchpads and computing devices with which the techniques of the present disclosure are implemented. For example, different thresholds and parameters can be adjusted and tuned based upon sensor types, distances between antennas, and other hardware aspects.

Figure 12A:
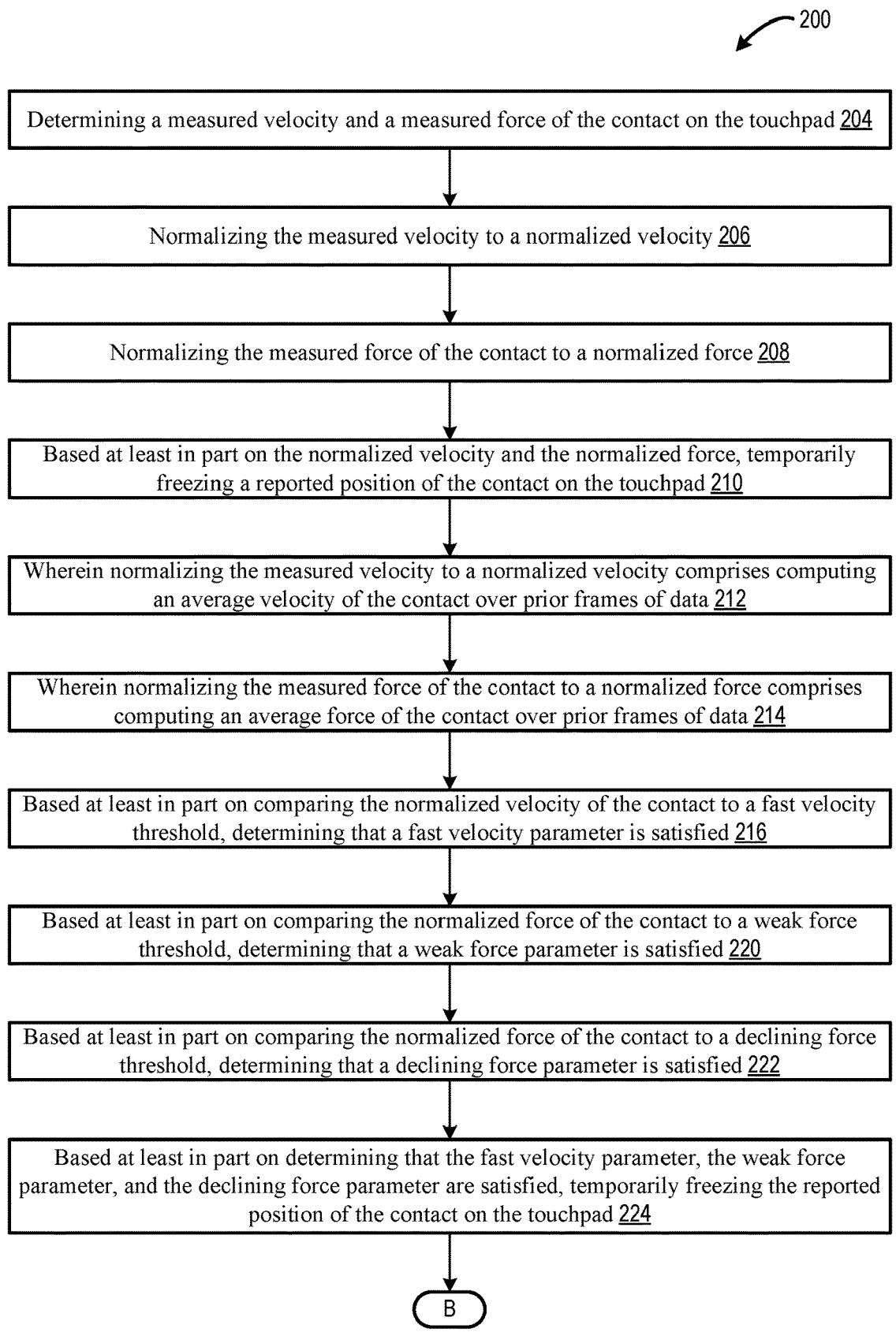
FIGS. 12A-12C are a flow chart of a method for tracking a contact on a touchpad to prevent unintended cursor movement according to examples of the present disclosure.
Figure 12B:
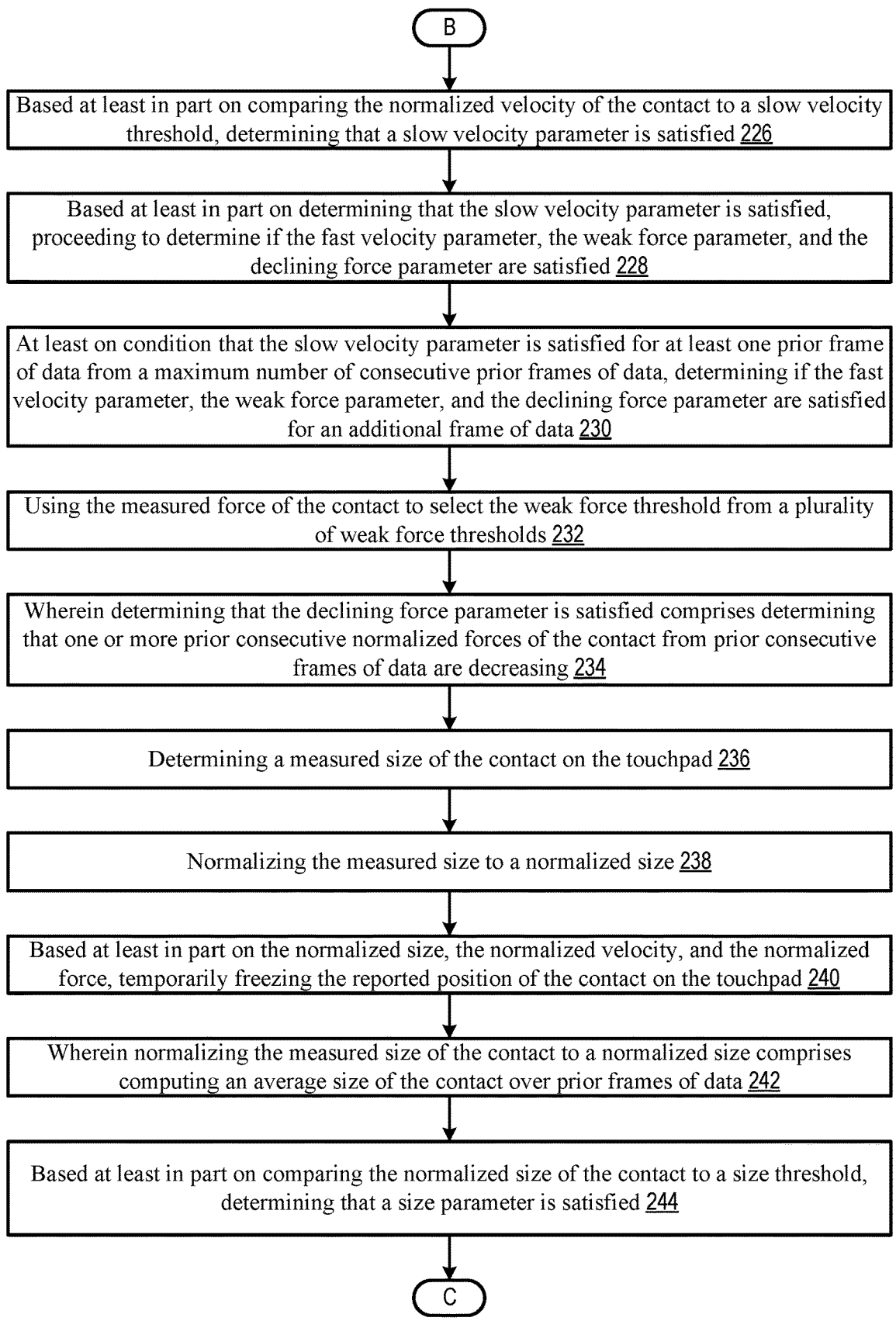
Figure 12C:
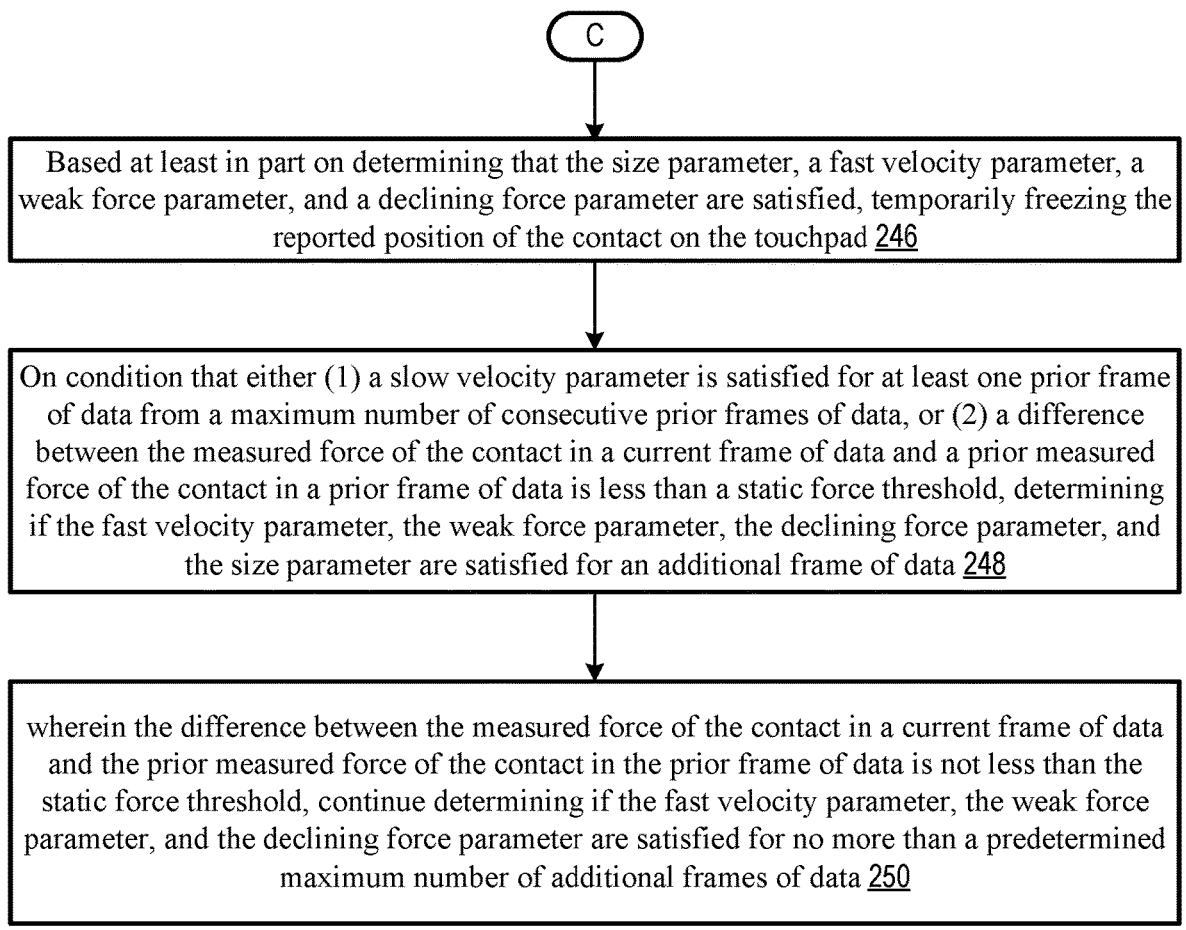

With reference now to FIGS. 12A-12C, a method 200 for tracking a contact on a touchpad to prevent unintended cursor movement will now be described. FIGS. 12A-12C depict a flowchart illustrating method 200. In some examples, method 200 may be implemented and performed by computing device 100 as described above. In other examples, method 200 may be implemented and performed using other touchpads and/or computing devices.

The following description of method 200 is provided by way of example and is not meant to be limiting. Therefore, it is to be understood that method 200 may include additional and/or alternative steps relative to those illustrated in FIGS. 12A-12C. Further, it is to be understood that the steps of method 200 may be performed in any suitable order. Further still, it is to be understood that one or more steps may be omitted from method 200 without departing from the scope of this disclosure. It will also be appreciated that method 200 also may be performed in other contexts using other suitable components.

With reference to FIG. 12A, at 204 method 200 include determining a measured velocity and a measured force of the contact on the touchpad. At 206 method 200 includes normalizing the measured velocity of the contact to a normalized velocity. At 208 method 200 includes normalizing the measured force of the contact to a normalized force. At 210 method 200 includes, based at least in part on the normalized velocity and the normalized force, temporarily freezing a reported position of the contact on the touchpad.

At 212 method 200 includes wherein normalizing the measured velocity to a normalized velocity comprises computing an average velocity of the contact over prior frames of data. At 214 method 200 includes wherein normalizing the measured force of the contact to a normalized force comprises computing an average force of the contact over prior frames of data. At 216 method 200 includes based at least in part on comparing the normalized velocity of the contact to a fast velocity threshold, determining that a fast velocity parameter is satisfied. At 220 method 200 includes, based at least in part on comparing the normalized force of the contact to a weak force threshold, determining that a weak force parameter is satisfied. At 222 method 200 includes, based at least in part on comparing the normalized force of the contact to a declining force threshold, determining that a declining force parameter is satisfied. At 224 method 200 includes, based at least in part on determining that the fast velocity parameter, the weak force parameter, and the declining force parameter are satisfied, temporarily freezing the reported position of the contact on the touchpad.

With reference now to FIG. 12B, at 226 method 200 includes, based at least in part on comparing the normalized velocity of the contact to a slow velocity threshold, determining that a slow velocity parameter is satisfied. At 228 method 200 includes, based at least in part on determining that the slow velocity parameter is satisfied, proceeding to determine if the fast velocity parameter, the weak force parameter, and the declining force parameter are satisfied. At 230 method 200 includes, at least on condition that the slow velocity parameter is satisfied for at least one prior frame of data from a maximum number of consecutive prior frames of data, determining if the fast velocity parameter, the weak force parameter, and the declining force parameter are satisfied for an additional frame of data.

At 232 method 200 includes using the measured force of the contact to select the weak force threshold from a plurality of weak force thresholds. At 234 method 200 includes wherein determining that the declining force parameter is satisfied comprises determining that one or more prior consecutive normalized forces of the contact from prior consecutive frames of data are decreasing. At 236 method 200 includes determining a measured size of the contact on the touchpad. At 238 method 200 includes normalizing the measured size to a normalized size. At 240 method 200 includes, based at least in part on the normalized size, the normalized velocity, and the normalized force, temporarily freezing the reported position of the contact on the touchpad.

At 242 method 200 includes wherein normalizing the measured size of the contact to a normalized size comprises computing an average size of the contact over prior frames of data. At 244 method 200 includes, based at least in part on comparing the normalized size of the contact to a size threshold, determining that a size parameter is satisfied. With reference now to FIG. 12C, at 246 method 200 includes, based at least in part on determining that the size parameter, a fast velocity parameter, a weak force parameter, and a declining force parameter are satisfied, temporarily freezing the reported position of the contact on the touchpad.

At 248 method 200 includes, on condition that either (1) a slow velocity parameter is satisfied for at least one prior frame of data from a maximum number of consecutive prior frames of data, or (2) a difference between the measured force of the contact in a current frame of data and a prior measured force of the contact in a prior frame of data is less than a static force threshold, determining if the fast velocity parameter, the weak force parameter, the declining force parameter, and the size parameter are satisfied for an additional frame of data. At 250 method 200 includes wherein the difference between the measured force of the contact in a current frame of data and the prior measured force of the contact in the prior frame of data is not less than the static force threshold, continue determining if the fast velocity parameter, the weak force parameter, and the declining force parameter are satisfied for no more than a predetermined maximum number of additional frames of data.

Figure 13:
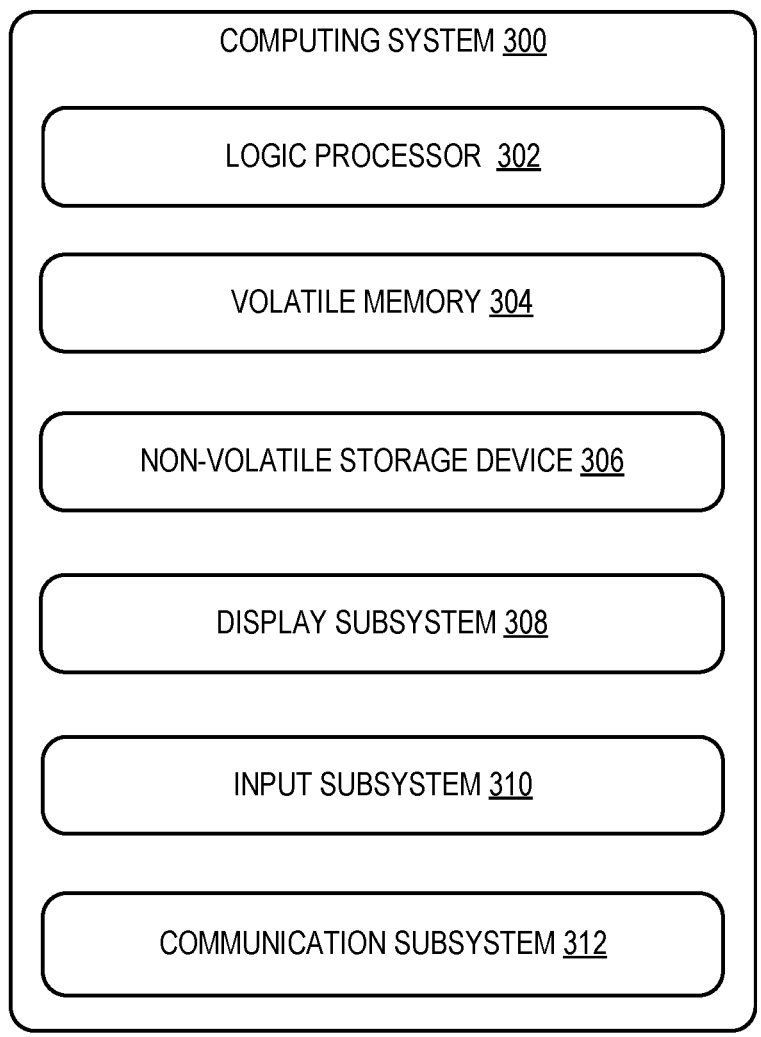
FIG. 13 shows a block diagram of an example computing system according to examples of the present disclosure.

In some embodiments, the techniques, touchpads, and components described herein may be utilized with a computing system of one or more computing devices. Similarly, the methods and processes described herein may be implemented as a computer-application program or service, an application-programming interface (API), a library, and/or other computer-program product. FIG. 13 schematically shows a non-limiting embodiment of a computing system 300 configured to provide any to all of the compute functionality described herein. Computing system 300 is shown in simplified form.

Laptop computing device 100 described above may comprise computing system 300 or one or more aspects of computing system 300. Computing system 300 may take the form of one or more laptops, personal computers, server computers, tablet computers, home-entertainment computers, gaming devices, mobile computing devices, mobile communication devices (e.g., smart phone), wearable computing devices, and/or other computing devices.

Computing system 300 includes a logic processor 302, volatile memory 304, and a non-volatile storage device 306. Computing system 300 may optionally include a display subsystem 308, input subsystem 310, communication subsystem 312, and/or other components not shown in FIG. 13.

Logic processor 302 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 304 may include physical devices that include random access memory (RAM). Volatile memory 304 is typically utilized by logic processor 302 to temporarily store information during processing of software instructions. It will be appreciated that volatile memory 304 typically does not continue to store instructions when power is cut to the volatile memory 304.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), magnetic memory (e.g., hard-disk drive, floppy-disk drive, tape drive, MRAM, etc.), and/or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 308 may be used to present a visual representation of data held by non-volatile storage device 306. As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

Input subsystem 310 may comprise or interface with one or more user-input devices such as touchpad 120, keyboard 124, touch screen display 128, a mouse, electronic pen, stylus, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as an HDMI over Wi-Fi connection. In some embodiments, the communication subsystem may allow computing system 300 to send and/or receive messages to and/or from other devices via a network such as the Internet.

The following paragraphs provide additional support for the claims of the subject application. One aspect provides a method for tracking a contact on a touchpad to prevent unintended cursor movement, the method comprising: determining a measured velocity and a measured force of the contact on the touchpad; normalizing the measured velocity of the contact to a normalized velocity; normalizing the measured force of the contact to a normalized force; and based at least in part on the normalized velocity and the normalized force, temporarily freezing a reported position of the contact on the touchpad. The method may additionally or alternatively include, normalizing the measured velocity to the normalized velocity comprises computing an average velocity of the contact over prior frames of data; and normalizing the measured force of the contact to the normalized force comprises computing an average force of the contact over prior frames of data. The method may additionally or alternatively include, based at least in part on comparing the normalized velocity of the contact to a fast velocity threshold, determining that a fast velocity parameter is satisfied; based at least in part on comparing the normalized force of the contact to a weak force threshold, determining that a weak force parameter is satisfied; based at least in part on comparing the normalized force of the contact to a declining force threshold, determining that a declining force parameter is satisfied; and based at least in part on determining that the fast velocity parameter, the weak force parameter, and the declining force parameter are satisfied, temporarily freezing the reported position of the contact on the touchpad. The method may additionally or alternatively include, based at least in part on comparing the normalized velocity of the contact to a slow velocity threshold, determining that a slow velocity parameter is satisfied; and based at least in part on determining that the slow velocity parameter is satisfied, proceeding to determine if the fast velocity parameter, the weak force parameter, and the declining force parameter are satisfied. The method may additionally or alternatively include, at least on condition that the slow velocity parameter is satisfied for at least one prior frame of data from a maximum number of consecutive prior frames of data, determining if the fast velocity parameter, the weak force parameter, and the declining force parameter are satisfied for an additional frame of data. The method may additionally or alternatively include, using the measured force of the contact to select the weak force threshold from a plurality of weak force thresholds. The method may additionally or alternatively include, wherein determining that the declining force parameter is satisfied comprises determining that one or more prior consecutive normalized forces of the contact from prior consecutive frames of data are decreasing. The method may additionally or alternatively include, determining a measured size of the contact on the touchpad; normalizing the measured size to a normalized size; and based at least in part on the normalized size, the normalized velocity, and the normalized force, temporarily freezing the reported position of the contact on the touchpad. The method may additionally or alternatively include, wherein normalizing the measured size of the contact to a normalized size comprises computing an average size of the contact over prior frames of data. The method may additionally or alternatively include, based at least in part on comparing the normalized size of the contact to a size threshold, determining that a size parameter is satisfied; and based at least in part on determining that the size parameter, a fast velocity parameter, a weak force parameter, and a declining force parameter are satisfied, temporarily freezing the reported position of the contact on the touchpad. The method may additionally or alternatively include, on condition that either (1) a slow velocity parameter is satisfied for at least one prior frame of data from a maximum number of consecutive prior frames of data, or (2) a difference between the measured force of the contact in a current frame of data and a prior measured force of the contact in a prior frame of data is less than a static force threshold, determining if the fast velocity parameter, the weak force parameter, the declining force parameter, and the size parameter are satisfied for an additional frame of data. The method may additionally or alternatively include, on condition that the difference between the measured force of the contact in a current frame of data and the prior measured force of the contact in the prior frame of data is not less than the static force threshold, continue determining if the fast velocity parameter, the weak force parameter, and the declining force parameter are satisfied for no more than a predetermined maximum number of additional frames of data.

Another aspect provides a computing device, comprising: a touchpad; a processor; and a memory storing instructions executable by the processor to: determine a measured velocity and a measured force of a contact on the touchpad; normalize the measured velocity to a normalized velocity; normalize the measured force of the contact to a normalized force; and based at least in part on the normalized velocity and the normalized force, temporarily freeze a reported position of the contact on the touchpad. The computing device may additionally or alternatively include, normalizing the measured velocity to a normalized velocity comprises computing an average velocity of the contact over prior frames of data; and normalizing the measured force of the contact to a normalized force comprises computing an average force of the contact over prior frames of data. The computing device may additionally or alternatively include, wherein the instructions are executable to: based at least in part on comparing the normalized velocity of the contact to a fast velocity threshold, determine that a fast velocity parameter is satisfied; based at least in part on comparing the normalized force of the contact to a weak force threshold, determine that a weak force parameter is satisfied; based at least in part on comparing the normalized force of the contact to a declining force threshold, determine that a declining force parameter is satisfied; and based at least in part on determining that the fast velocity parameter, the weak force parameter, and the declining force parameter are satisfied, temporarily freeze the reported position of the contact on the touchpad. The computing device may additionally or alternatively include, wherein the instructions are executable to: based at least in part on comparing the normalized velocity of the contact to a slow velocity threshold, determine that a slow velocity parameter is satisfied; and based at least in part on determining that the slow velocity parameter is satisfied, proceed to determine if the fast velocity parameter, the weak force parameter, and the declining force parameter are satisfied. The computing device may additionally or alternatively include, wherein the instructions are executable to: determine a measured size of the contact on the touchpad; normalize the measured size to a normalized size; and based at least in part on the normalized size, the normalized velocity, and the normalized force, temporarily freeze the reported position of the contact on the touchpad. The computing device may additionally or alternatively include, wherein normalizing the measured size of the contact to a normalized size comprises computing an average size of the contact over prior frames of data. The computing device may additionally or alternatively include, wherein the instructions are executable to: based at least in part on comparing the normalized size of the contact to a size threshold, determine that a size parameter is satisfied; and based at least in part on determining that the size parameter, a fast velocity parameter, a weak force parameter, and a declining force parameter are satisfied, temporarily freeze the reported position of the contact on the touchpad.

Another aspect provides a computing device, comprising: a capacitive touchpad; a processor; and a memory storing instructions executable by the processor to: determine a measured velocity, a measured force, and a measured size of the contact on the touchpad; normalize the measured velocity to a normalized velocity by at least computing an average velocity of the contact over prior frames of data; normalize the measured force of the contact to a normalized force by at least computing an average force of the contact over prior frames of data; normalize the measured size to a normalized size by at least computing an average size of the contact over prior frames of data; and based at least in part on the normalized velocity, the normalized force, and the normalized size of the contact, temporarily freeze a reported position of the contact on the touchpad.

Another aspect provides a method for tracking a contact on a touchpad to prevent unintended cursor movement, the method comprising: determining a measured velocity, a measured force, and a measured size of the contact on the touchpad; normalizing the measured velocity of the contact to a normalized velocity; normalizing the measured force of the contact to a normalized force; normalizing the measured size of the contact to a normalized size; and based at least in part on the normalized velocity, the normalized force, and the normalized size, temporarily freezing a reported position of the contact on the touchpad. The method may additionally or alternatively include, wherein: normalizing the measured velocity to a normalized velocity comprises computing an average velocity of the contact over prior frames of data; normalizing the measured force of the contact to a normalized force comprises computing an average force of the contact over prior frames of data; and normalizing the measured size of the contact to a normalized size comprises computing an average size of the contact over prior frames of data. The method may additionally or alternatively include, based at least in part on comparing the normalized velocity of the contact to a fast velocity threshold, determining that a fast velocity parameter is satisfied; based at least in part on comparing the normalized force of the contact to a weak force threshold, determining that a weak force parameter is satisfied; based at least in part on comparing the normalized force of the contact to a declining force threshold, determining that a declining force parameter is satisfied; based at least in part on comparing the normalized size of the contact to a size threshold, determining that a size parameter is satisfied; and based at least in part on determining that the fast velocity parameter, the weak force parameter, the declining force parameter, and the size parameter are satisfied, temporarily freezing the reported position of the contact on the touchpad. The method may additionally or alternatively include, based at least in part on comparing the normalized velocity of the contact to a slow velocity threshold, determining that a slow velocity parameter is satisfied; and based at least in part on determining that the slow velocity parameter is satisfied, proceeding to determine if the fast velocity parameter, the weak force parameter, the declining force parameter, and the size parameter are satisfied. The method may additionally or alternatively include, at least on condition that the slow velocity parameter is satisfied for at least one prior frame of data from a maximum number of consecutive prior frames of data, determining if the fast velocity parameter, the weak force parameter, the declining force parameter, and the size parameter are satisfied for an additional frame of data. The method may additionally or alternatively include, on condition that either (1) the slow velocity parameter is satisfied for at least one prior frame of data from a maximum number of consecutive prior frames of data, or (2) a difference between the measured force of the contact in a current frame of data and a prior measured force of the contact in a prior frame of data is less than a static force threshold, determining if the fast velocity parameter, the weak force parameter, the declining force parameter, and the size parameter are satisfied for an additional frame of data. The method may additionally or alternatively include, on condition that the difference between the measured force of the contact in a current frame of data and a prior measured force of the contact in a prior frame of data is not less than the static force threshold, continue determining if the fast velocity parameter, the weak force parameter, the declining force parameter, and the size parameter are satisfied for no more than a predetermined maximum number of additional frames of data. The method may additionally or alternatively include using the measured force of the contact to select the weak force threshold from a plurality of weak force thresholds. The method may additionally or alternatively include, wherein determining that the declining force parameter is satisfied comprises determining that one or more prior consecutive normalized forces of the contact from prior consecutive frames of data are decreasing.

Another aspect provides a computing device, comprising: a touchpad; a processor; and a memory storing instructions executable by the processor to: determine a measured velocity, a measured force, and a measured size of a contact on the touchpad; normalize the measured velocity of the contact to a normalized velocity; normalize the measured force of the contact to a normalized force; normalize the measured size of the contact to a normalized size; and based at least in part on the normalized velocity, the normalized force, and the normalized size, temporarily freeze a reported position of the contact on the touchpad. The computing device may additionally or alternatively include, wherein normalizing the measured velocity to a normalized velocity comprises computing an average velocity of the contact over prior frames of data; normalizing the measured force of the contact to a normalized force comprises computing an average force of the contact over prior frames of data; and normalizing the measured size to a normalized size comprises computing an average size of the contact over prior frames of data. The computing device may additionally or alternatively include, wherein the instructions are executable to: based at least in part on comparing the normalized velocity of the contact to a fast velocity threshold, determine that a fast velocity parameter is satisfied; based at least in part on comparing the normalized force of the contact to a weak force threshold, determine that a weak force parameter is satisfied; based at least in part on comparing the normalized force of the contact to a declining force threshold, determine that a declining force parameter is satisfied; based at least in part on comparing the normalized size of the contact to a size threshold, determine that a size parameter is satisfied; and based at least in part on determining that the fast velocity parameter, the weak force parameter, the declining force parameter, and the size parameter are satisfied, temporarily freeze the reported position of the contact on the touchpad. The computing device may additionally or alternatively include, wherein the instructions are executable to: based at least in part on comparing the normalized velocity of the contact to a slow velocity threshold, determine that a slow velocity parameter is satisfied; and based at least in part on determining that the slow velocity parameter is satisfied, proceed to determine if the fast velocity parameter, the weak force parameter, the declining force parameter, and the size parameter are satisfied. The computing device may additionally or alternatively include, wherein the instructions are executable to, at least on condition that the slow velocity parameter is satisfied for at least one prior frame of data from a maximum number of consecutive prior frames of data, determine if the fast velocity parameter, the weak force parameter, the declining force parameter, and the size parameter are satisfied for an additional frame of data. The computing device may additionally or alternatively include, wherein the instructions are executable to, on condition that either (1) the slow velocity parameter is satisfied for at least one prior frame of data from a maximum number of consecutive prior frames of data, or (2) a difference between the measured force of the contact in a current frame of data and a prior measured force of the contact in a prior frame of data is less than a static force threshold, determine if the fast velocity parameter, the weak force parameter, the declining force parameter, and the size parameter are satisfied for an additional frame of data. The computing device may additionally or alternatively include, wherein the instructions are executable to, at least on condition that the difference between the measured force of the contact in a current frame of data and a prior measured force of the contact in a prior frame of data is not less than the static force threshold, continue determining if the fast velocity parameter, the weak force parameter, the declining force parameter, and the size parameter are satisfied for no more than a predetermined maximum number of additional frames of data. The computing device may additionally or alternatively include, wherein the instructions are executable to use the measured force of the contact to select the weak force threshold from a plurality of weak force thresholds. The computing device may additionally or alternatively include, wherein determining that the declining force parameter is satisfied comprises determining that one or more prior consecutive normalized forces of the contact from prior consecutive frames of data are decreasing.

Another aspect provides a computing device, comprising: a capacitive touchpad; a processor; and a memory storing instructions executable by the processor to: determine a measured velocity, a measured force, and a measured size of the contact on the touchpad; normalize the measured velocity to a normalized velocity by at least computing an average velocity of the contact over prior frames of data; based at least in part on comparing the normalized velocity of the contact to a fast velocity threshold, determine that a fast velocity parameter is satisfied; normalize the measured force of the contact to a normalized force by at least computing an average force of the contact over prior frames of data; based at least in part on comparing the normalized force of the contact to a weak force threshold, determine that a weak force parameter is satisfied; based at least in part on comparing the normalized force of the contact to a declining force threshold, determine that a declining force parameter is satisfied; normalize the measured size of the contact to a normalized size by at least computing an average size of the contact over prior frames of data; based at least in part on comparing the normalized size of the contact to a size threshold, determine that a size parameter is satisfied; and based at least in part on determining that the fast velocity parameter, the weak force parameter, the declining force parameter, and the size parameter are satisfied, temporarily freeze the reported position of the contact on the touchpad. The computing device may additionally or alternatively include, wherein the instructions are executable to use the measured force of the contact to select the weak force threshold from a plurality of weak force thresholds.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for tracking a contact on a touchpad to prevent unintended cursor movement, the method comprising:
   determining a measured velocity and a measured force of the contact on the touchpad;
   normalizing the measured velocity of the contact to yield a normalized velocity;
   normalizing the measured force of the contact to yield a normalized force; and
   based at least in part on the normalized velocity and the normalized force, temporarily freezing a reported position of the contact on the touchpad.

2. The method of claim 1, wherein:
   normalizing the measured velocity to the normalized velocity comprises computing an average velocity of the contact over prior frames of data; and
   normalizing the measured force of the contact to the normalized force comprises computing an average force of the contact over prior frames of data.

3. The method of claim 1, further comprising:
   based at least in part on comparing the normalized velocity of the contact to a fast velocity threshold, determining that a fast velocity parameter is satisfied;
   based at least in part on comparing the normalized force of the contact to a weak force threshold, determining that a weak force parameter is satisfied;
   based at least in part on comparing the normalized force of the contact to a declining force threshold, determining that a declining force parameter is satisfied; and
   based at least in part on determining that the fast velocity parameter, the weak force parameter, and the declining force parameter are satisfied, temporarily freezing the reported position of the contact on the touchpad.

4. The method of claim 3, further comprising:
   based at least in part on comparing the normalized velocity of the contact to a slow velocity threshold, determining that a slow velocity parameter is satisfied; and
   based at least in part on determining that the slow velocity parameter is satisfied, proceeding to determine if the fast velocity parameter, the weak force parameter, and the declining force parameter are satisfied.

5. The method of claim 4, further comprising:
   at least on condition that the slow velocity parameter is satisfied for at least one prior frame of data from a maximum number of consecutive prior frames of data, determining if the fast velocity parameter, the weak force parameter, and the declining force parameter are satisfied for an additional frame of data.

6. The method of claim 3, further comprising using the measured force of the contact to select the weak force threshold from a plurality of weak force thresholds.

7. The method of claim 3, wherein determining that the declining force parameter is satisfied comprises determining that one or more prior consecutive normalized forces of the contact from prior consecutive frames of data are decreasing.

8. The method of claim 1, further comprising:
   determining a measured size of the contact on the touchpad;
   normalizing the measured size to a normalized size; and
   based at least in part on the normalized size, the normalized velocity, and the normalized force, temporarily freezing the reported position of the contact on the touchpad.

9. The method of claim 8, wherein normalizing the measured size of the contact to a normalized size comprises computing an average size of the contact over prior frames of data.

10. The method of claim 8, further comprising:
    based at least in part on comparing the normalized size of the contact to a size threshold, determining that a size parameter is satisfied; and
    based at least in part on determining that the size parameter, a fast velocity parameter, a weak force parameter, and a declining force parameter are satisfied, temporarily freezing the reported position of the contact on the touchpad.

11. The method of claim 10, further comprising:
    on condition that either (1) a slow velocity parameter is satisfied for at least one prior frame of data from a maximum number of consecutive prior frames of data, or (2) a difference between the measured force of the contact in a current frame of data and a prior measured force of the contact in a prior frame of data is less than a static force threshold, determining if the fast velocity parameter, the weak force parameter, the declining force parameter, and the size parameter are satisfied for an additional frame of data.

12. The method of claim 11, further comprising, on condition that the difference between the measured force of the contact in a current frame of data and the prior measured force of the contact in the prior frame of data is not less than the static force threshold, continue determining if the fast velocity parameter, the weak force parameter, and the declining force parameter are satisfied for no more than a predetermined maximum number of additional frames of data.

13. A computing device, comprising:
    a touchpad;
    a processor; and
    a memory storing instructions executable by the processor to:
       determine a measured velocity and a measured force of a contact on the touchpad;
       normalize the measured velocity to yield a normalized velocity;
       normalize the measured force of the contact to yield a normalized force; and
       based at least in part on the normalized velocity and the normalized force, temporarily freeze a reported position of the contact on the touchpad.

14. The computing device of claim 13, wherein:
    normalizing the measured velocity to a normalized velocity comprises computing an average velocity of the contact over prior frames of data; and
    normalizing the measured force of the contact to a normalized force comprises computing an average force of the contact over prior frames of data.

15. The computing device of claim 13, wherein the instructions are executable to:
    based at least in part on comparing the normalized velocity of the contact to a fast velocity threshold, determine that a fast velocity parameter is satisfied;

based at least in part on comparing the normalized force of the contact to a weak force threshold, determine that a weak force parameter is satisfied;

based at least in part on comparing the normalized force of the contact to a declining force threshold, determine that a declining force parameter is satisfied; and based at least in part on determining that the fast velocity parameter, the weak force parameter, and the declining force parameter are satisfied, temporarily freeze the reported position of the contact on the touchpad.

16. The computing device of claim 15, wherein the instructions are executable to:

based at least in part on comparing the normalized velocity of the contact to a slow velocity threshold, determine that a slow velocity parameter is satisfied; and based at least in part on determining that the slow velocity parameter is satisfied, proceed to determine if the fast velocity parameter, the weak force parameter, and the declining force parameter are satisfied.

17. The computing device of claim 13, wherein the instructions are executable to:

determine a measured size of the contact on the touchpad;

normalize the measured size to a normalized size; and based at least in part on the normalized size, the normalized velocity, and the normalized force, temporarily freeze the reported position of the contact on the touchpad.

18. The computing device of claim 17, wherein normalizing the measured size of the contact to a normalized size comprises computing an average size of the contact over prior frames of data.

19. The computing device of claim 17, wherein the instructions are executable to:

based at least in part on comparing the normalized size of the contact to a size threshold, determine that a size parameter is satisfied; and based at least in part on determining that the size parameter, a fast velocity parameter, a weak force parameter, and a declining force parameter are satisfied, temporarily freeze the reported position of the contact on the touchpad.

20. A computing device, comprising:

a capacitive touchpad;

a processor; and a memory storing instructions executable by the processor to:

determine a measured velocity, a measured force, and a measured size of the contact on the touchpad;

normalize the measured velocity to yield a normalized velocity by at least computing an average velocity of the contact over prior frames of data;

normalize the measured force of the contact to yield a normalized force by at least computing an average force of the contact over prior frames of data;

normalize the measured size to yield a normalized size by at least computing an average size of the contact over prior frames of data; and based at least in part on the normalized velocity, the normalized force, and the normalized size of the contact, temporarily freeze a reported position of the contact on the touchpad.

* * * * *